United States Patent
Mitsuoka et al.

(10) Patent No.: US 9,893,336 B2
(45) Date of Patent: Feb. 13, 2018

(54) BIAXIALLY STRETCHED MICROPOROUS FILM

(71) Applicant: Toray Battery Separator Film Co., Ltd., Nasushiobara (JP)

(72) Inventors: Hideto Mitsuoka, Nasushiobara (JP); Kazuhiro Yamada, Nasushiobara (JP); Shintaro Kikuchi, Nasushiobara (JP); Toshiya Saito, Nasushiobara (JP)

(73) Assignee: Toray Industries, Inc. (JP)

( * ) Notice: Subject to any disclaimer, the term of this patent is extended or adjusted under 35 U.S.C. 154(b) by 325 days.

(21) Appl. No.: 14/432,301

(22) PCT Filed: Oct. 3, 2013

(86) PCT No.: PCT/JP2013/076927
§ 371 (c)(1),
(2) Date: Mar. 30, 2015

(87) PCT Pub. No.: WO2014/054726
PCT Pub. Date: Apr. 10, 2014

(65) Prior Publication Data
US 2015/0280194 A1    Oct. 1, 2015

(30) Foreign Application Priority Data

Oct. 3, 2012  (JP) .................. 2012-221121

(51) Int. Cl.
*B32B 27/32* (2006.01)
*D02J 1/06* (2006.01)
(Continued)

(52) U.S. Cl.
CPC ............. *H01M 2/1653* (2013.01); *C08J 5/18* (2013.01); *C08J 2323/06* (2013.01);
(Continued)

(58) Field of Classification Search
None
See application file for complete search history.

(56) References Cited

U.S. PATENT DOCUMENTS

| | | |
|---|---|---|
| 2003/0032687 A1 | 2/2003 | Takata et al. |
| 2009/0226814 A1 | 9/2009 | Takita et al. |
| 2010/0099838 A1 | 4/2010 | Takeda et al. |

FOREIGN PATENT DOCUMENTS

| | | |
|---|---|---|
| JP | 2001-240690 | 9/2001 |
| JP | 2002-264208 | 9/2002 |

(Continued)

OTHER PUBLICATIONS

Thomas Sun et al., "Effect of Short Chain Branching on the Coil Dimensions of Polyolefins in Dilute Solution," *Macromolecules*, vol. 34, No. 19, 2001, pp. 6812-6820.

(Continued)

*Primary Examiner* — David Sample
*Assistant Examiner* — Nicole T Gugliotta
(74) *Attorney, Agent, or Firm* — DLA Piper LLP (US)

(57) ABSTRACT

A biaxially stretched microporous film includes band-like polyethylene material having a film width of not less than 300 mm wherein distribution of physical properties in the film width direction and the thickness variation is less than 1.00 μm and air permeability variation is not greater than 50 seconds/100 mL. The polyethylene microporous film has excellent planarity and uniformity of physical properties required when used in a large-area configuration as a separator film of a lithium ion battery for automobiles or consumer electronics.

14 Claims, 5 Drawing Sheets

(51) Int. Cl.
  *B29C 55/00*   (2006.01)
  *B29C 71/00*   (2006.01)
  *H01M 6/00*    (2006.01)
  *H01M 2/16*    (2006.01)
  *C08J 5/18*    (2006.01)
  *H01M 10/0525* (2010.01)

(52) U.S. Cl.
  CPC ........ *H01M 10/0525* (2013.01); *Y02E 60/122* (2013.01); *Y02P 70/54* (2015.11)

(56) References Cited

FOREIGN PATENT DOCUMENTS

| | | |
|---|---|---|
| JP | 2003-105122 | 4/2003 |
| JP | 2006-056929 | 3/2006 |
| JP | 2011-516624 | 5/2011 |
| WO | 2007/015416 | 2/2007 |

OTHER PUBLICATIONS

Supplementary Search dated Feb. 28, 2017, included with an Official Action dated Mar. 14, 2017, of corresponding Chinese Application No. 201380048751.4.

The First Office Action dated Jun. 14, 2016, of corresponding Chinese Application No. 201380048751.4, along with an English translation.

BIAXIALLY STRETCHED MICROPOROUS FILM

TECHNICAL FIELD

This disclosure relates to a biaxially stretched microporous film having excellent uniformity of the physical properties required in the separator of a battery.

BACKGROUND

Polyethylene thin films as disclosed in WO 2007/015416, Japanese Unexamined Patent Application Publication (Translation of PCT Application) No. 2011-516624A, and Japanese Unexamined Patent Application Publication No. 2001-240690A, especially polyethylene microporous films, deform microscopically at room temperature because the glass transition temperature of the resin itself is below room temperature. For this reason, it is difficult to uniformly obtain the physical properties required when used as the separator of a lithium ion battery or the like. In particular, when the film is large in the width or longitudinal directions, it is extremely difficult to assure uniformity of various physical properties across the entire face.

Thus, in the past, only the portions of a film where the various physical properties were uniform were selected to be used in various applications.

In the development of lithium ion batteries for modern automobiles and consumer electronics, as battery size has increased and as produced quantities have increased, it has become necessary to enlarge the area in both the width and longitudinal directions of the polyethylene microporous film used as the separator. Thus, it has become greatly desired to examine the causes of non-uniformity of films and to develop a polyethylene microporous film having excellent uniformity of various characteristics and planarity in a film that is large in the width and longitudinal directions.

Thus, it could be helpful to provide a polyethylene microporous film having excellent planarity and uniformity of the various characteristics required in the separator of a battery, even in large-area films.

SUMMARY

We thus provide:

A biaxially stretched microporous film including band-like polyethylene material having a film width of not less than 300 mm wherein distribution of physical properties in a film width direction and a thickness variation is less than 1.00 μm and air permeability variation is not greater than 50 seconds/100 mL.

The biaxially stretched microporous film, wherein the film comprises band-like polyethylene material relaxation-treated in a film longitudinal direction.

The biaxially stretched microporous film, wherein the film comprises band-like polyethylene material stretch-treated while being heated while being moved along a temperature gradient.

The biaxially stretched microporous film, wherein, in regard to distribution of physical properties in the film width direction, a ratio of a maximum value and a minimum value (maximum value/minimum value) of shrinkage stress per unit cross-sectional area at 40° C. is 1.00 to 1.30.

The biaxially stretched microporous film, wherein a film width direction component of shrinkage stress per unit cross-sectional area at 40° C. is not greater than 1.2 N/mm$^2$.

The biaxially stretched microporous film, wherein variation of the film width direction component or a film longitudinal direction component of shrinkage stress per unit cross-sectional area at 40° C. is less than 0.1 N/mm$^2$.

DETAILED DESCRIPTION

Figure 1:
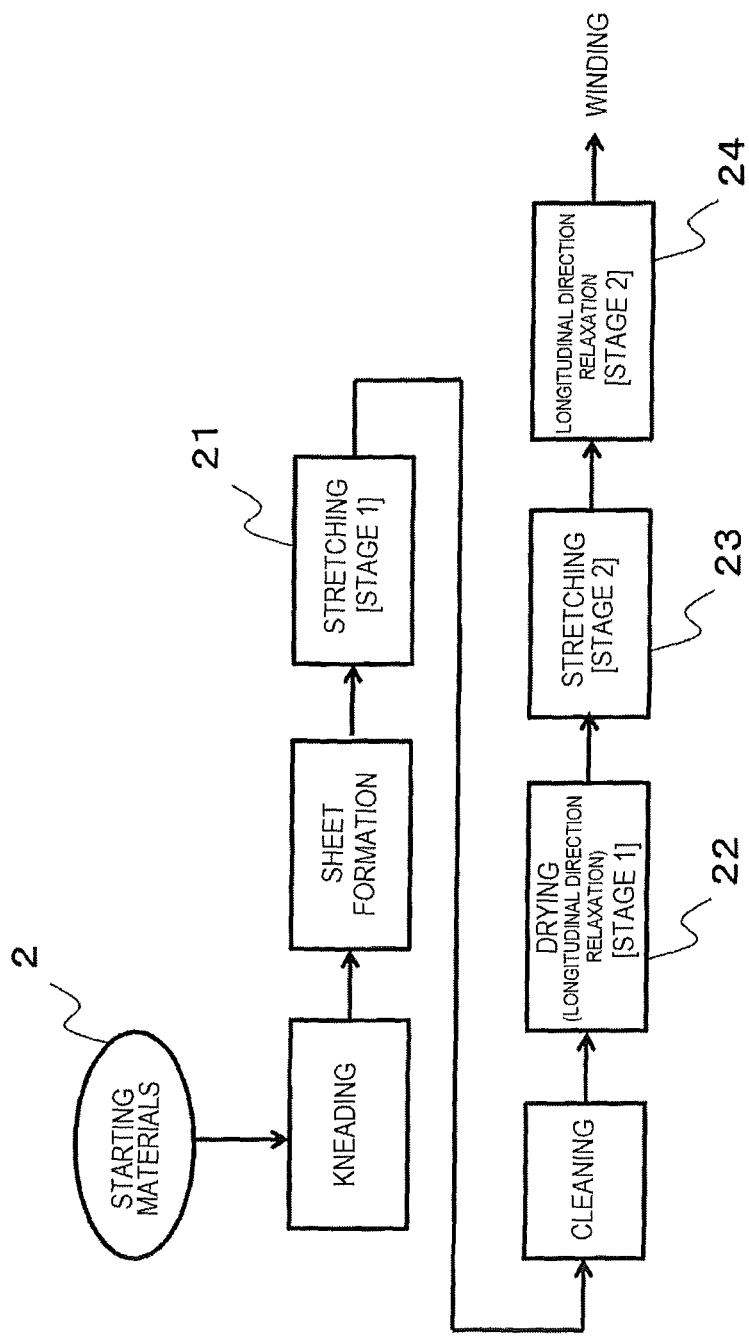
FIG. 1 is a schematic diagram illustrating the production process of a biaxially stretched microporous film.

Our biaxially stretched microporous film comprises band-like polyethylene material having a film width of not less than 300 mm. In regard to distribution of physical properties in the film width direction, thickness variation is set to less than 1.00 μm and air permeability variation is set to not greater than 50 seconds/100 mL.

This biaxially stretched microporous film preferably comprises band-like polyethylene material that has been relaxation-treated in the film longitudinal direction. Specifically, the band-like polyethylene material is preferably relaxation-treated in the film longitudinal direction with a relaxation rate of, for example, from 0.5% to 8.0%, preferably from 1.0% to 5.0%, and most preferably from 1.5% to 4.0%, throughout the entire process. Furthermore, the relaxation speed is, for example, from 0 to 2.0%/second, and preferably from 0 to 1.0%/second. By implementing such relaxation treatment, it is possible to obtain a biaxially stretched microporous film having excellent planarity and uniformity of physical properties across a wide area.

In particular, the biaxially stretched microporous film having excellent planarity has excellent processability in formation of a heat-resistant layer on at least one face, which is desired in separators for use in lithium ion batteries for automobiles and consumer electronics. That is, when a heat-resistant layer is formed by coating, vapor deposition, or sputtering, yield and productivity during heat-resistant film formation can be improved by using film having excellent planarity.

The biaxially stretched microporous film preferably comprises band-like polyethylene material that has been stretch-treated while being heated while being moved along a temperature gradient. In particular, equalization of film physical properties can be more effectively achieved by combining moving and heating along a temperature gradient with relaxation treatment in the film longitudinal direction. A temperature gradient tends to equalize heat transfer to the film. The temperature gradient is preferably set such that the stretching zone is at least 5° C. higher than the preheating zone. The preheating zone is the location in the heated oven where the film is not stretched in either the MD or TD directions. Furthermore, the stretching zone is the location in the heated oven where the film is stretched in at least the MD or TD directions.

In regard to distribution of physical properties in the film width direction, the ratio of the maximum value and the minimum value (maximum value/minimum value=variation ratio) of shrinkage stress per unit cross-sectional area at 40° C. is 1.00 to 1.30. By the variation ratio of shrinkage stress in the width direction being within the above range, planarity and uniformity of physical properties of the film are easily kept within their target ranges when the shrinkage stress is relieved after film production. The variation ratio of shrinkage stress in the width direction is more preferably from 1.00 to 1.25, and most preferably from 1.00 to 1.20.

Furthermore, in the biaxially stretched microporous film, the film width direction component of shrinkage stress per unit cross-sectional area at 40° C. is preferably not greater than 1.20 N/mm$^2$. By the film width direction component of shrinkage stress being held within this range, shrinkage deformation in the film width direction is suppressed, and as a result, once uniformity of film physical properties is assured, it is prevented from being lost due to film deformation.

In addition, in the biaxially stretched microporous film, in regard to distribution of physical properties in the film width direction, variation of the film width direction component or the film longitudinal direction component of shrinkage stress per unit cross-sectional area at 40° C. is preferably less than 0.10 N/mm$^2$. For example, even when it is difficult to fully eliminate shrinkage stress remaining in a produced biaxially stretched microporous film, uniformity of film physical properties can be maintained by setting the magnitude of shrinkage stress to a uniform value without variation across the film width direction.

It is thus possible to provide a biaxially stretched microporous film having excellent planarity and little variation of shrinkage stress in the width direction. Therefore, in the production process of batteries obtained using the biaxially stretched microporous film as the substrate of the separator, variation of shrinkage can be suppressed to a low level and the amount of deformation at each position in the width direction or the longitudinal direction is the same even when the substrate is heated or external stress is applied. For this reason, processability is excellent, and variation of layer thickness of the formed processed layers and defects such as continuous coating stripes do not readily occur.

Our films and methods will be described based on examples. To obtain polyethylene microporous film of a desired thickness, the extruded quantity of polymer was adjusted to a prescribed value unless otherwise stated.

Practical Example 1

A polyethylene composition 2 was prepared, comprising 40 wt % ultra-high molecular weight polyethylene (UHMWPE), in which a viscoelastic relaxation phenomenon is observed near 90° C., and having weight-average molecular weight (Mw) of 2.0×10$^6$, molecular weight distribution (Mw/Mn) of 5, and melting point of 135° C., and 60 wt % high-density polyethylene (HDPE), in which a viscoelastic relaxation phenomenon is observed near 90° C., and having Mw of 5.6×10$^5$, Mw/Mn of 4.1, and melting point of 135° C., and having 0.1 terminal vinyl groups per 10,000 carbon atoms. The melting point Tm of the polyethylene composition 2 was 135° C., and a viscoelastic relaxation phenomenon was observed near 90° C.

The microporous film of this example is effective when the contained amount of ultra-high molecular weight polyethylene is large. The contained amount of ultra-high molecular weight polyethylene is preferably from 2 to 50 wt %, more preferably from 5 to 47 wt %, even more preferably from 10 to 44 wt %, and most preferably from 15 to 40 wt %. The microporous film obtained by the production method of this example, while having excellent secondary processing characteristics, can impart excellent safety to a battery when used as a separator of a lithium ion battery.

Note that Mw and Mw/Mn of UHMWPE and HDPE were determined by gel permeation chromatography (GPC) according to the method described in Macromolecules, Vol. 34, No. 19, pp. 6812-6820 (2001) (similarly hereinafter).

Measurement apparatus: PL-GPC220 manufactured by Polymer Laboratories

Columns: Three PLgel MIXED-B columns, manufactured by Polymer Laboratories

Column temperature: 145° C.

Solvent (mobile phase): 1,2,4-trichlorobenzene (containing approximately 1000 ppm butylated hydroxytoluene; manufactured by Sigma-Aldrich Corp.)

Solvent flow rate: 0.5 mL/minute

Sample concentration: From 0.25 to 0.75 mg/mL (dissolution conditions: 160° C./2 hours)

Injection quantity: 300 µL

Detector: Differential refractometer

Calibration curve: Created using prescribed conversion coefficient from calibration curve obtained using monodisperse polystyrene standard sample Following the production process of biaxially stretched microporous film illustrated in FIG. 1, the polyethylene composition 2 as a starting material was put in a twin-screw extruder to result in 25 wt % of the total weight of the polyethylene solution. Liquid paraffin (50 cst (40° C.)) was supplied from a side feeder of the twin-screw extruder to result in 75 wt %, and this was melt-kneaded at 210° C. and 350 rpm to prepare a polyethylene solution. This polyethylene solution was extruded from a T-die provided on the twin-screw extruder, and it was cooled while being drawn by a cooling roller heated to 30° C., and a gel-like sheet was formed.

The draft ratio when the polymer in the melted stated extruded from the T-die contacted the cooling roller was 2.0. Draft ratio means the deformation rate of the film in the melted state, and is determined by formula 1 below.

Draft ratio=speed of cooling roller/flow rate of polymer immediately before emission from T-die     Formula 1

When the draft ratio is high, changes in width sometimes occur, which may cause variation of thickness in the longitudinal direction. In the microporous film of this example, it is important that the draft ratio be from 1.0 to 5.0. It is preferably from 1.5 to 3.0, and most preferably from 1.7 to 2.7.

The obtained gel-like sheet was simultaneously biaxially stretched 500% in both the longitudinal direction and width direction at 120° C. by a tenter stretcher and, in this state, the film width was fixed in the tenter stretcher, and heat setting treatment was performed at 120° C. for 10 seconds (stretching treatment process 21 (stage 1)).

As the oven of the tenter stretcher, an oven made up of six zones delimited at equal intervals in the longitudinal direction was used. The two zones (zones 1 and 2) nearest the twin-screw extruder of the previous stage were set to 110° C., the next two zones (zones 3 and 4) were set to 115° C., and the two zones (zones 5 and 6) nearest the winder of the final stage were set to 120° C. Stretching treatment in the longitudinal direction and the width direction was performed in zones 3 and 4.

Next, the stretched gel-like sheet was immersed in a methylene chloride bath and the liquid paraffin was removed and cleaned off, and polyethylene microporous film 1 was obtained.

Figure 2:
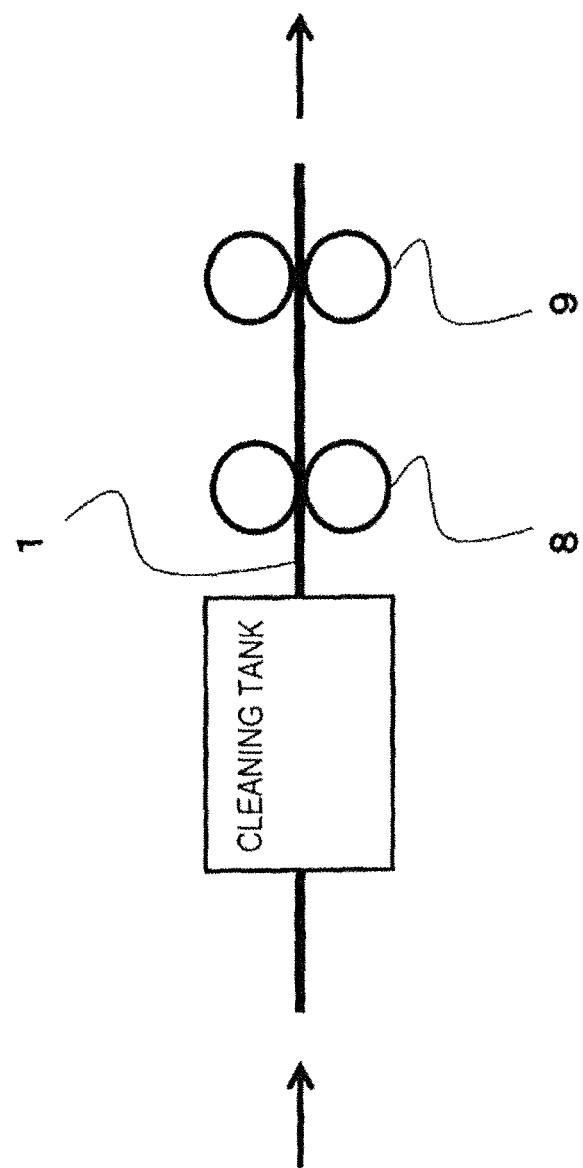
FIG. 2 is a schematic diagram illustrating part of the production process illustrated in the schematic diagram of FIG. 1 (cleaning process and longitudinal direction relaxation treatment process (stage 1)).

As illustrated in FIG. 2, the polyethylene microporous film 1 obtained immediately after cleaning is conveyed by two heated rollers 8 and 9. At this time, the circumferential speed of the second roller 9 was 1.5% lower than the circumferential speed of the first roller 8. While the conveyed microporous film 1 was relaxed 1.5% in the longitudinal direction, the methylene chloride of the cleaning solvent was dried (longitudinal direction relaxation treatment process 22 (stage 1)).

The various conditions used up through the longitudinal direction relaxation treatment process 22 (stage 1) are shown in Table 1.

TABLE 1

|  | UHMWPE (ultra-high molecular weight PE) Contained amount (wt %) | HDPE Contained amount (wt %) | Concentration of PE resin composition in solution (wt %) | Draft ratio of molten polymer and cooling roller |
|---|---|---|---|---|
| Practical Example 1 | 40 | 60 | 25 | 2.0 |
| Practical Example 2 | 40 | 60 | 25 | 3.0 |
| Practical Example 3 | 40 | 60 | 25 | 1.5 |
| Practical Example 4 | 40 | 60 | 25 | 1.0 |
| Practical Example 5 | 40 | 60 | 25 | 5.0 |
| Practical Example 6 | 40 | 60 | 25 | 2.0 |
| Practical Example 7 | 40 | 60 | 25 | 2.0 |
| Practical Example 8 | 40 | 60 | 28 | 2.0 |
| Practical Example 9 | 18 | 82 | 30 | 2 0 |
| Practical Example 10 | 18 | 82 | 30 | 2.0 |
| Comparative Example 1 | 40 | 60 | 25 | 0.9 |
| Comparative Example 2 | 40 | 60 | 25 | 0.9 |

| | Stage 1 Stretching treatment | | | |
|---|---|---|---|---|
| | Stretching method | Temperature (° C.) | Magnification ratio (longitudinal direction × width direction) | Temperature setting of tenter stretcher zones 1-2/ zones 3-4/ zones 5-6 |
| Practical Example 1 | Tenter method | 115 | 5 × 5 | 110/115/120 |
| Practical Example 2 | Tenter method | 115 | 5 × 5 | 110/115/120 |
| Practical Example 3 | Tenter method | 115 | 5 × 5 | 110/115/120 |
| Practical Example 4 | Tenter method | 115 | 5 × 5 | 110/115/120 |
| Practical Example 5 | Tenter method | 115 | 5 × 5 | 110/115/120 |
| Practical Example 6 | Tenter method | 115 | 5 × 5 | 110/115/120 |
| Practical Example 7 | Tenter method | 115 | 5 × 5 | 110/115/120 |
| Practical Example 8 | Tenter method | 120 | 7 × 7 | 110/120/120 |
| Practical Example 9 | Tenter method | 110 | 5 × 5 | 110/110/120 |
| Practical Example 10 | Tenter method | 110 | 5 × 5 | 110/110/120 |
| Comparative Example 1 | Tenter method | 115 | 5 × 5 | 115/115/115 |
| Comparative Example 2 | Tenter method | 115 | 5 × 5 | 110/115/120 |

| | Stage 1 Longitudinal direction relaxation treatment | | |
|---|---|---|---|
| | Relaxation method | Temperature (° C.) | Longitudinal direction relaxation rate (%) |
| Practical Example 1 | Roller method | 80 | 1.5 |
| Practical Example 2 | Roller method | 75 | 1.5 |
| Practical Example 3 | Roller method | 85 | 1.5 |
| Practical Example 4 | Roller method | 80 | 1 |
| Practical Example 5 | Roller method | 80 | 2 |
| Practical Example 6 | Roller method | 80 | 1.5 |
| Practical Example 7 | Roller method | 80 | 1.5 |
| Practical Example 8 | Roller method | 80 | 1.5 |
| Practical Example 9 | Roller method | 80 | 1.5 |
| Practical Example 10 | Roller method | 80 | 1.5 |
| Comparative Example 1 | Roller method | 80 | 1.5 |
| Comparative Example 2 | Roller method | 80 | 0 |

The obtained polyethylene microporous film 1 was stretched 140% in the width direction by the tenter stretcher, and in this state, the film width was fixed in the tenter stretcher, and heat setting treatment was performed at 130° C. for 20 seconds (stretching treatment process 23 (stage 2)).

As the oven of the tenter stretcher, an oven made up of eight zones delimited at equal intervals in the longitudinal direction was used. The zone (zone 7) nearest the twin-screw extruder of the previous stage was set to 115° C., the next two zones (zones 8 and 9) were set to 125° C., and the five zones (zones 10 to 14) nearest the winder of the final stage were set to 130° C. Stretching treatment in the width direction was performed in zones 8 and 9, and setting treatment was performed in zones 10 to 12.

Additionally, in zones 13 and 14 in the oven, with the microporous film 1 gripped with clips, relaxation treatment to relax the microporous film 1 3% in the width direction was performed (width direction relaxation treatment process).

Figure 3:
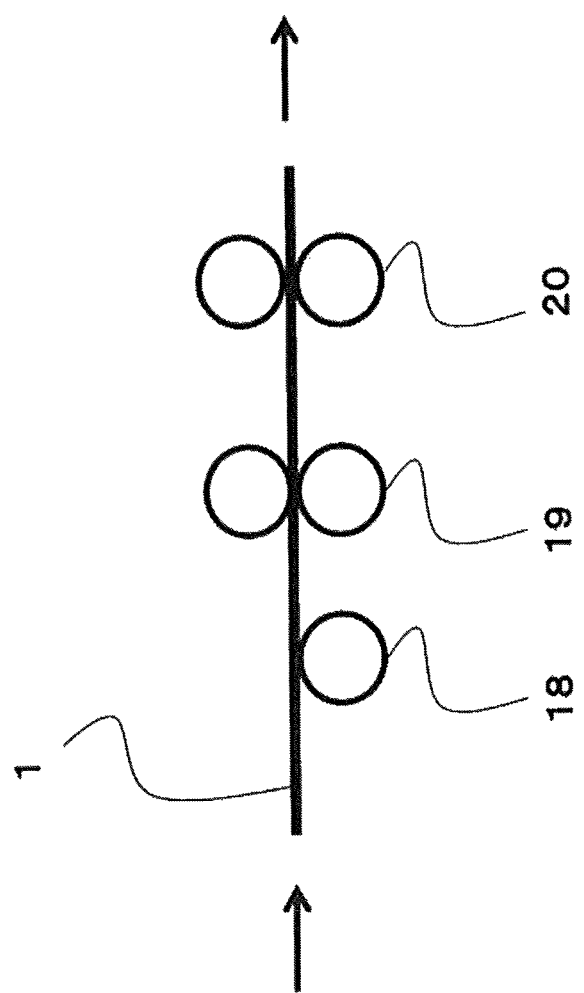
FIG. 3 is a schematic diagram illustrating part of the production process illustrated in the schematic diagram of FIG. 1 (longitudinal direction relaxation treatment process (stage 2)).

As illustrated in FIG. 3, after the stretching treatment process 23 (stage 2), the microporous film 1 was conveyed by two or more rollers (18, 19, 20) heated to 90° C., and annealing treatment was performed utilizing the difference in circumferential speed between the rollers 19 and 20. Due to the circumferential speed of the roller 20 before the winder being slower than the circumferential speed of the roller 19 nearest the twin-screw extruder, the annealing treatment using rollers 19 and 20 relaxed the microporous film 1 between the rollers with a relaxation rate of 1.5% in the longitudinal direction at a relaxation speed of 0.8%/second in the longitudinal direction (longitudinal direction relaxation treatment 24 (stage 2)).

The various conditions used from the stretching treatment process (23) (stage 2) through the longitudinal direction relaxation treatment process 24 (stage 2) are shown in Table 2.

TABLE 2

| | Stage 2 Stretching treatment | | | | |
|---|---|---|---|---|---|
| | Stretching method | Stretching temperature (° C.) | Magnification ratio (Width direction) | Heat setting temperature (° C.) | Temperature settings of tenter stretcher 17 zone 7/zones 8-9/ zones 10-14 |
| Practical Example 1 | Tenter method | 125 | 1.4 | 130 | 115/125/130 |
| Practical Example 2 | Tenter method | 125 | 1.4 | 130 | 115/125/130 |
| Practical Example 3 | Tenter method | 125 | 1.4 | 130 | 115/125/130 |
| Practical Example 4 | Tenter method | 125 | 1.4 | 130 | 115/125/130 |
| Practical Example 5 | Tenter method | 125 | 1.4 | 130 | 115/125/130 |
| Practical Example 6 | Tenter method | 125 | 1.4 | 130 | 115/125/130 |
| Practical Example 7 | Tenter method | 125 | 1.4 | 130 | 115/125/130 |
| Practical Example 8 | Tenter method | 125 | 1.5 | 130 | 115/125/130 |
| Practical Example 9 | Tenter method | 125 | 1.4 | 130 | 115/125/130 |
| Practical Example 10 | Tenter method | 125 | 1.4 | 130 | 115/125/130 |
| Comparative Example 1 | Tenter method | 125 | 1.4 | 125 | 125/125/125 |
| Comparative Example 2 | Tenter method | 125 | 1.4 | 130 | 115/125/130 |

| | Width direction relaxation treatment | | | Stage 2 Longitudinal direction relaxation treatment | | | |
|---|---|---|---|---|---|---|---|
| | Relaxation method | Temperature (° C.) | Width direction relaxation rate (%) | Relaxation method | Roller contact time (seconds) | Temperature (° C.) | Longitudinal direction relaxation rate (%) |
| Practical Example 1 | Tenter method | 130 | 3 | Roller method | 6 | 90 | 1.5 |
| Practical Example 2 | Tenter method | 130 | 3 | Roller method | 6 | 85 | 1.5 |
| Practical Example 3 | Tenter method | 130 | 3 | Roller method | 6 | 100 | 1.5 |
| Practical Example 4 | Tenter method | 130 | 3 | Roller method | 6 | 90 | 1.0 |
| Practical Example 5 | Tenter method | 130 | 3 | Roller method | 6 | 90 | 3.0 |
| Practical Example 6 | Tenter method | 130 | 3 | Roller method | 6 | 90 | 1.5 |
| Practical Example 7 | Tenter method | 130 | 3 | Roller method | 6 | 90 | 1.5 |
| Practical Example 8 | Tenter method | 130 | 3 | Roller method | 6 | 90 | 1.5 |
| Practical Example 9 | Tenter method | 130 | 3 | Roller method | 6 | 90 | 1.5 |
| Practical Example 10 | Tenter method | 130 | 3 | Roller method | 6 | 90 | 1.5 |
| Comparative Example 1 | Tenter method | 130 | 3 | Roller method | 6 | 90 | 1.5 |
| Comparative Example 2 | Tenter method | 130 | 3 | Roller method | 6 | 90 | 0 |

The polyethylene microporous film 1 was then cooled to room temperature and wound on a roller of a winder to produce polyethylene microporous film with a thickness of 9 μm.

The obtained roll of polyethylene microporous film was cut to a width of 500 mm, and a roll of polyethylene microporous film having a size of 500 mm in the width direction and a longitudinal length of 1000 m in the longitudinal direction was obtained.

The obtained microporous film had excellent dimensional stability and shape stability. When a coating layer was formed on the microporous film in further processing, the defect rate of the product due to coating variation was low.

The various physical properties of the obtained microporous films are shown in Table 3.

TABLE 3

| | Film physical properties | | | | | |
|---|---|---|---|---|---|---|
| | Film width (mm) | Film thickness (μm) | Width direction Thickness variation (μm) | Longitudinal direction Thickness variation (μm) | Air permeability (seconds/100 mL) | Air permeability variation (seconds/100 mL) [Difference between maximum and minimum] |
| Practical Example 1 | 500 | 9 | 0.20 | 0.30 | 150 | 10 |
| Practical Example 2 | 500 | 9 | 0.30 | 0.50 | 150 | 10 |
| Practical Example 3 | 500 | 9 | 0.30 | 0.50 | 150 | 10 |
| Practical Example 4 | 500 | 9 | 0.50 | 0.40 | 150 | 20 |
| Practical Example 5 | 500 | 9 | 0.80 | 1.00 | 150 | 20 |
| Practical Example 6 | 750 | 9 | 0.90 | 0.30 | 150 | 30 |
| Practical Example 7 | 1100 | 9 | 0.99 | 0.30 | 150 | 45 |
| Practical Example 8 | 500 | 7 | 0.70 | 0.30 | 90 | 15 |
| Practical Example 9 | 500 | 7 | 0.20 | 0.30 | 100 | 15 |
| Practical Example 10 | 500 | 5 | 0.15 | 0.25 | 70 | 10 |
| Comparative Example 1 | 500 | 9 | 1.50 | 1.80 | 100 | 55 |
| Comparative Example 2 | 500 | 9 | 1.20 | 1.80 | 120 | 60 |

| | Variation ratio of shrinkage stress at 40° C. [maximum/minimum] TD (width direction) | Shrinkage stress at 40° C. (N/mm$^2$) | | Variation of shrinkage stress at 40° C. (N/mm$^2$) [Difference between maximum and minimum] TD (width direction) | Coating defects |
|---|---|---|---|---|---|
| | | MD (longitudinal direction) | TD (width direction) | | |
| Practical Example 1 | 1.05 | 0.35 | 0.40 | 0.010 | A |
| Practical Example 2 | 1.06 | 0.50 | 0.50 | 0.015 | A |
| Practical Example 3 | 1.05 | 0.35 | 0.60 | 0.015 | A |
| Practical Example 4 | 1.06 | 0.55 | 0.70 | 0.020 | A |
| Practical Example 5 | 1.05 | 0.40 | 0.80 | 0.020 | A |
| Practical Example 6 | 1.05 | 0.35 | 0.40 | 0.015 | A |
| Practical Example 7 | 1.08 | 0.35 | 0.40 | 0.010 | A |

TABLE 3-continued

| | | | | | |
|---|---|---|---|---|---|
| Practical Example 8 | 1.30 | 1.00 | 1.10 | 0.145 | B |
| Practical Example 9 | 1.05 | 0.35 | 0.40 | 0.010 | A |
| Practical Example 10 | 1.05 | 0.35 | 0.40 | 0.010 | A |
| Comparative Example 1 | 1.50 | 0.60 | 1.50 | 0.300 | C |
| Comparative Example 2 | 1.40 | 0.60 | 1.20 | 0.200 | C |

Practical Examples 2 to 10

Polyethylene microporous films were produced and evaluated by the same methods as Practical Example 1 except that film physical properties were varied as shown in Table 3 by varying the production conditions, as shown in Tables 1 and 2.

Comparative Example 1

Polyethylene microporous films were produced and evaluated by the same methods as Practical Example 1 except that there was no temperature gradient between the zones in the oven of the tenter stretcher, as shown in Tables 1 and 2.

Comparative Example 2

Polyethylene microporous films were produced and evaluated by the same methods as Practical Example 1 except that the stage 1 and stage 2 longitudinal direction relaxation treatments were not performed, as shown in Tables 1 and 2.

Methods of Measuring Physical Properties

The methods of measuring the physical properties of the microporous films will be described below.

(a) Gurley Air Permeability

Gurley air permeability was measured at 23° C., 65% RH according to JIS P 8117 (1998) (units: seconds/100 mL). The same measurement was performed five times for the same test piece, and the average of the obtained Gurley air permeability values was used as the Gurley air permeability of that test piece. At that time, a test piece whose average Gurley air permeability exceeded 1000 seconds/100 mL was considered to have substantially no air permeability, and the value of infinity ($\infty$) seconds/100 mL was used in this case.

The microporous film that was the subject of measurement was measured every 6 cm in the width direction from the location of the end in the film width direction, and the average value of the measurements was used as the Gurley air permeability of that microporous film. Furthermore, the difference between the maximum and minimum measurement results for air permeability in the width direction was taken as the variation of air permeability.

(e) Microporous Film Thickness (μm)

A test piece was produced by cutting out a square 5 cm in the longitudinal direction and 5 cm in the width direction from any location of the microporous film. Any five points on the test piece were measured using a thickness measurement device, and the average value was taken as the thickness of that test piece. Ten test pieces of the same polyethylene microporous film were prepared and measured. The average value of all 10 test pieces was taken as the thickness of the microporous film.

The thickness measurement device used was a Litematic VL-50A manufactured by Mitutoyo Corp.

Width Direction Thickness Variation

In the width direction of the microporous film, the thickness of the polyethylene microporous film was measured using a Litematic VL-50A manufactured by Mitutoyo Corp. at a measurement pitch of 1 cm from one end of the film to the other. The value of the maximum minus the minimum of the measurement results was taken as the width direction thickness variation.

Longitudinal Direction Thickness Variation

For 50 m in the longitudinal direction of the microporous film, the thickness of the polyethylene microporous film was measured using a Litematic VL-50A manufactured by Mitutoyo Corp. at a measurement pitch of 1 cm from one end of the film in the longitudinal direction to the other. The value of the maximum minus the minimum of the measurement results was taken as the longitudinal direction thickness variation.

(f) Effective Stretch Ratio

On unstretched polyethylene microporous film that had been extruded from a slit die and cast on a metal drum and then cooled and solidified in sheet form, measurement squares 1 cm on a side were marked such that their sides were respectively parallel to the longitudinal direction and width direction of the microporous film, and then stretching and winding were performed. The lengths (cm) of 10 measurement squares on the obtained polyethylene microporous film were measured in the longitudinal direction, and the widths of 10 measurement squares were measured in the width direction, and their respective average values were taken as the effective stretch ratio in the longitudinal direction and the width direction.

(h) Coating Defects

First, a coating layer was formed on the microporous film as follows.

Production of Slurries 1 and 2

Polyvinylidene fluoride-chlorotrifluoroethylene copolymer (PvdF-CTFE) was added in an amount of 5 wt % to acetone, and then dissolved for 12 hours or more at 50° C. to obtain a polymer solution. To this polymer solution, $BaTiO_3$ powder was added to result in a ratio of $BaTiO_3$/PvdF-CTFE=90/10 (wt %), and the $BaTiO_3$ powder was crushed and dispersed for 12 hours or more using a ball mill to obtain a slurry 1. The $BaTiO_3$ particle diameter of the slurry 1 obtained in this manner was controlled by means of the size (diameter) of the beads used in ball milling and the duration of ball milling, and by crushing to a size of 400 nm, a slurry 2 was obtained.

Production of Slurry 3

$Al_2O_3$ powder was put in an acetone solution of 10 wt % dimethyl methylphosphonate (DMMP), and modified while stirring at 25° C. for 24 hours. Polyvinylidene fluoride-chlorotrifluoroethylene copolymer (PvdF-CTFE) was added in an amount of 5 wt % to acetone, and then dissolved for 12 hours at 50° C. to obtain a polymer solution. To this polymer solution, $Al_2O_3$ powder was added to result in a ratio of polymer solution: $Al_2O_3$=90:10 (wt %), and the $Al_2O_3$ powder was crushed and dispersed for 15 hours using a ball mill to obtain a slurry 3.

Production of Slurry 4

Equal volumes of slurry 2 and slurry 3 were mixed and fully stirred to produce a slurry 4. The polyethylene microporous film was coated with slurry 4 obtained in this manner by dip coating. The thickness of the coating layer was 3 μm.

Next, a length of 1 m of polyethylene microporous film was cut from the obtained polyethylene microporous film having the coating layer, and it was hung vertically in a dark room. Then, a black cloth with no luster was arranged on the entire back face of the microporous film, and while varying the angle of a three-band white fluorescent lamp (FL20SS EX-N/18P, manufactured by Panasonic) in a range from approximately 10° to 45° with respect to the polyethylene microporous film, the front face of the polyethylene microporous film was observed, and coating stripe defects 10 mm or more in length per square meter of evaluated area were detected and marked. Note that the width of a polyethylene microporous film may less than 1 m provided that the evaluated area is 1 m².

Furthermore, the length of the stripe defects were measured directly using a measuring stick near the polyethylene microporous film without touching it. Additionally, the side opposite the evaluated face was irradiated in the range of approximately 10° to 45° in the same manner as above using a bromine lamp (Video Light VLG301 100 V 300 W, manufactured by LPL), and was observed from the side on which the bromine lamp was irradiated (the side opposite the previously evaluated face), and coating stripe defects were detected and marked. At this time, a black cloth with no luster was arranged on the side opposite the observer. Note that stripes in the same location with respect to the width direction of the polyethylene microporous film were counted as one stripe, but if they were 100 mm or more apart, they were counted individually. The portions where a marked coating stripe defect was present were classified into two types: the continuous coating stripe defects mentioned in this specification, and coarse coating stripe defects in which particle agglomerates present in the coating liquid were clustered on the microporous film and were scattered in a stripe shape. The surface shape of a 1664×1248 μm field of vision was measured under the following measurement conditions using a non-contact three-dimensional shape measurement apparatus type 550 manufactured by Micro-Map.

Measurement Conditions
  Measurement mode: Wave mode
  Objective lens magnification ratio: 10×
  Used lens: 0.5× zoom lens Next, in contour line display mode, an image of the measurement face color-coded by height was displayed. At this time, surface correction (fourth-order function correction) was performed to eliminate undulations of the surface shape. In contour line display mode, taking the average height within the measurement range as 0 nm and setting the maximum height to 100 nm and the minimum height to −100 nm, the surface was displayed with protruding portions 100 nm or greater in height shown in red. Next, the same measurement field was displayed in cross-sectional profile display mode. On the cross-sectional movement screen, the two ends of the cursor were narrowed and moved along the long direction of the protrusion and such that the cursor passed through the location of maximum height. On the plot screen, the height scale was adjusted such that the entire protrusion was displayed. On the plot screen, two cursors were aligned with the two ends of the protrusion, and the height of the protrusion (long diameter) was read. Then, one cursor was aligned with the highest point of the protrusion, and another cursor was aligned with a height of 0 nm (=average height of measurement range), and the protrusion height was determined. The measurement location was moved in the extension direction of the measured stripe, and the above measurement was repeated until the length of the stripe judged to be the same stripe reached 10 mm. A nucleus aligned with the width within 0.5 mm of the width direction of the continuous coating stripe was counted as a nucleus of the same stripe.

Figure 4:
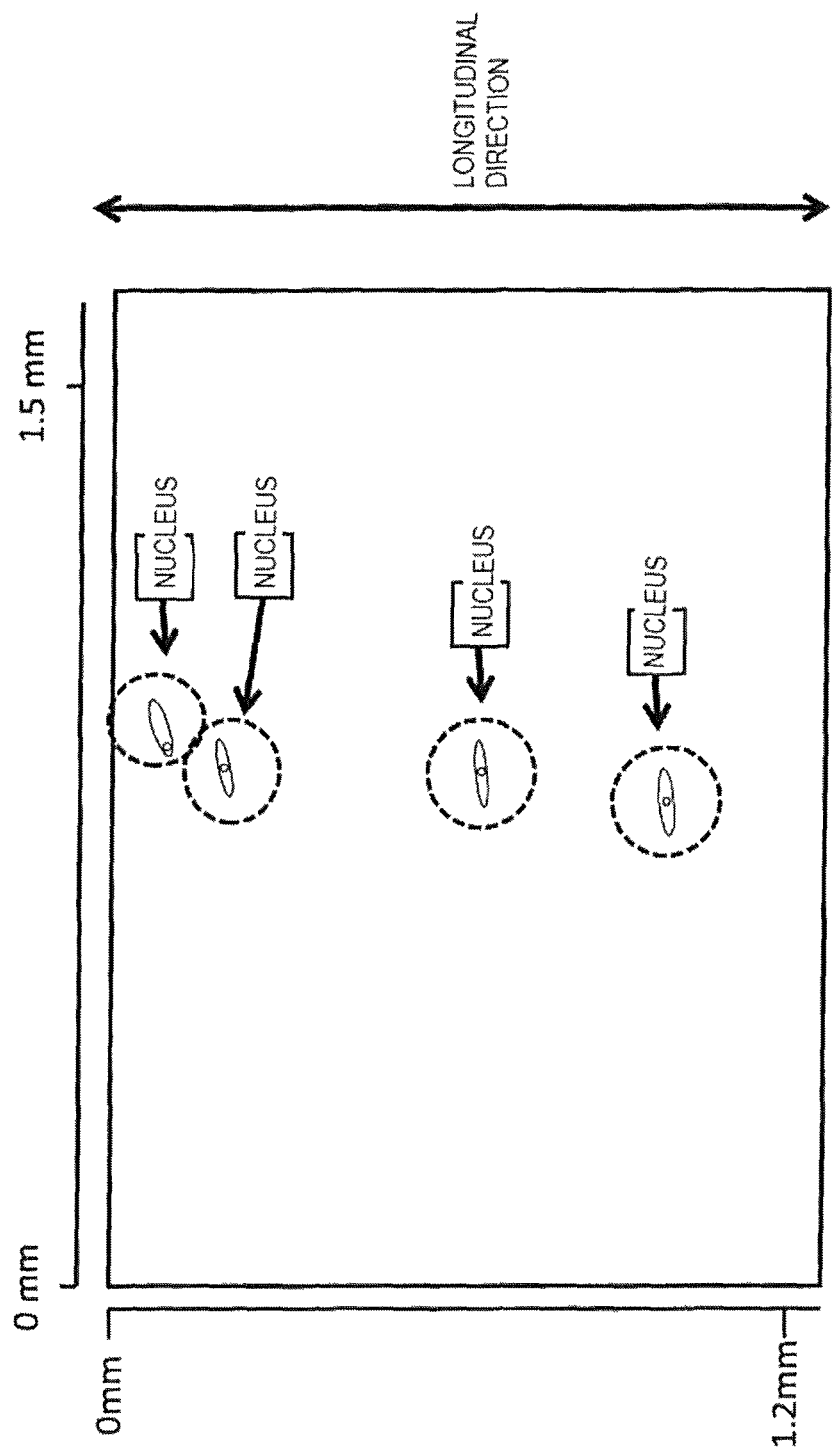
FIG. 4 is a schematic diagram illustrating the results of non-contact three-dimensional shape measurement of the coating layer surface of a biaxially stretched microporous film having a coating layer.
Figure 5:
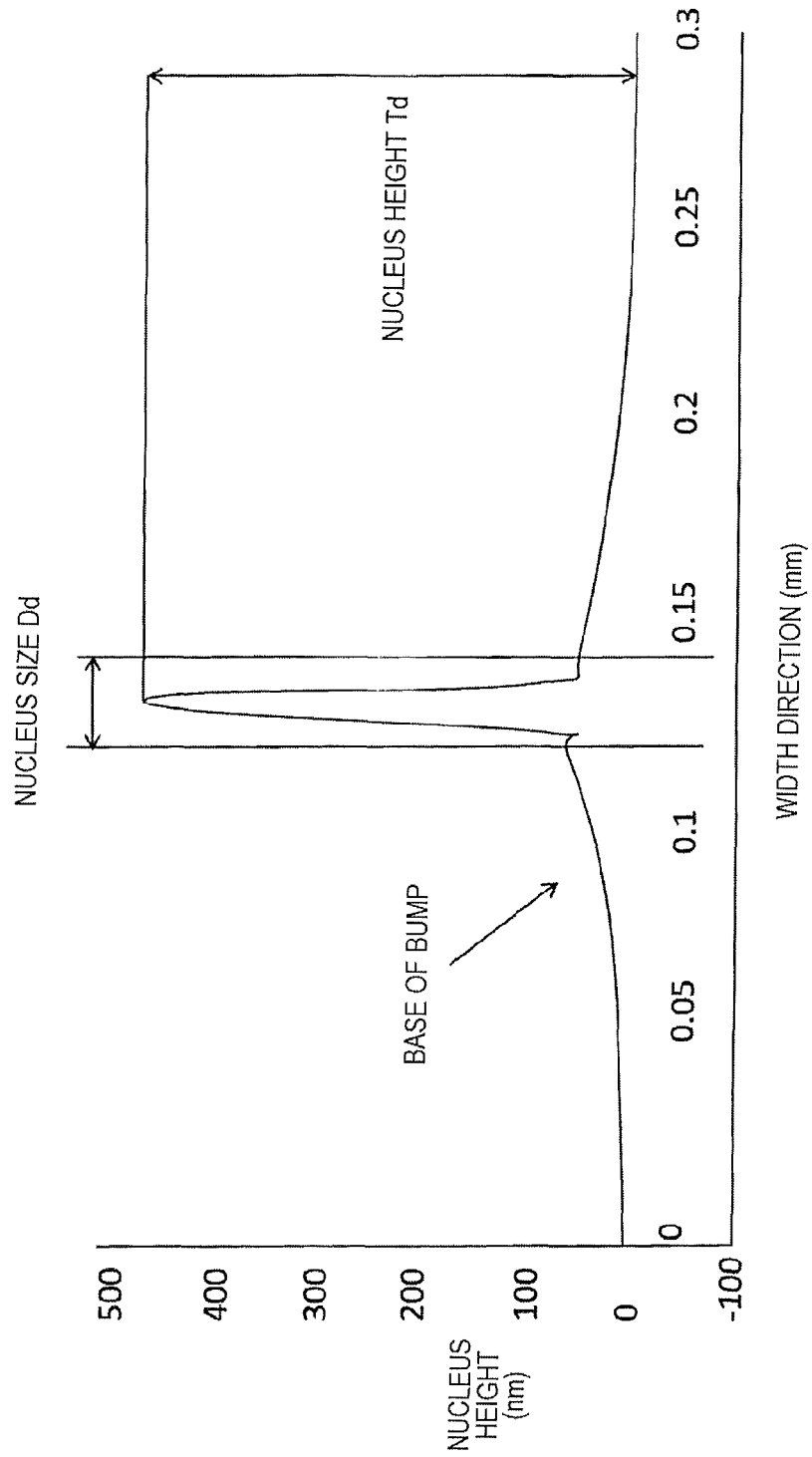
FIG. 5 is a schematic diagram illustrating a cross-sectional profile in the vicinity of the nucleus in FIG. 4.

FIG. 4 is an image obtained by non-contact three-dimensional shape measurement of a microporous film surface, displayed so that the bumps and recesses of the film surface can be seen three-dimensionally. The portions surrounded by circles are nuclei. FIG. 5 is a cross-sectional profile of a portion where a nucleus is present. When the average height of the microporous film surface was taken, there were portions (bumps) of which the height was higher than the average height. Specifically, as illustrated in FIGS. 4 and 5, in many cases the bump had a sharp peak shape, and a portion of lower height that spread out around it like the base of a mountain was made up primarily of resin component. The long diameter of a nucleus expressed as Dd is the peak width of this sharp peak shape (that is, with the average height of the microporous film surface as a reference, the height of one bump is the distance between two points where height sharply increases (two inflection points) when viewed from the two ends of the bump), and the length thereof is defined as that resulting in the maximum at the peak-shaped part of one of the bumps thereof (see FIG. 5). The maximum height of a nucleus expressed as Dt is defined as the difference between the maximum height of the nucleus and the average height of the microporous film surface (see FIG. 5).

As a result of the above measurement, a coating stripe defect in which defects having nuclei of the size defined in formula 4 and formula 5 below are continuous in the state defined in formula 6 and formula 7 below was determined to be a "continuous coating stripe defect," and the number of these per square meter of microporous film was counted, and used as the continuous coating stripe defect score of that polyethylene microporous film.

$$10 \ \mu m \leq Dd \leq 35 \ \mu m \quad \text{(Formula 4)}$$

$$100 \ nm \leq Dt \leq 800 \ nm \quad \text{(Formula 5)}$$

$$n \geq 2 \quad \text{(Formula 6)}$$

$$t \geq 10 \quad \text{(Formula 7)}$$

Dd: Long diameter of one nucleus of continuous defect part
Dt: Maximum height of one nucleus of continuous defect part
n: Number of nuclei of size defined in formula 4 and formula 5 present per mm of continuous coating stripe defect
t: Length of continuous stripe defect (mm)

Furthermore, when the number of continuous stripe defects per square meter at 100 m intervals along the longitudinal direction of the microporous film was evaluated, for the microporous film rolls obtained in the practical examples, stripe defects were detected and the number of continuous coating stripe defects was counted at 10 locations at intervals of 100 m, of the portion 10 m after unwinding, the portion 100 m after, the portion 200 m after and the like.

Taking the average of the 10 locations, the sample was evaluated as A when the number of continuous coating stripe defects was 50/m² or less, B when it was 50 to 80/m², and C when greater than 80.

(j) Shrinkage Stress

A strip-shaped test piece 4 mm×50 mm cut from microporous film was set in a thermomechanical analyzer (TMA/SS6000 manufactured by Seiko Instruments Inc.) with a distance between chucks of 10 mm, and it was heated at a rate of 5° C./minute while maintaining the distance between chucks, and the change in tensile force across the distance between chucks was measured. The tensile force at 23° C. was taken to be 0 N (reference).

The shrinkage force occurring when it was heated from 23° C. to the melting point of the film was measured, and the change in tensile stress versus temperature was plotted, and the value of heat shrinkage stress at 40° C. was determined.

The microporous film that was the subject of measurement was measured every 6 cm in the width direction, and the average value thereof was used as the shrinkage stress of that microporous film.

Furthermore, the difference between the maximum and minimum measurement results of shrinkage stress in the width direction was taken as the variation of shrinkage stress.

The biaxially stretched microporous film can be used in separator constituent materials of lithium ion batteries.

The invention claimed is:

1. A biaxially stretched microporous film comprising band-shaped polyethylene material having a film width of not less than 300 mm, wherein distribution of physical properties in a film width direction and a thickness variation is less than 1.00 μm, air permeability variation is not greater than 50 seconds/100 mL, and in regard to distribution of physical properties in the film width direction, a ratio of a maximum value and a minimum value (maximum value/minimum value) of shrinkage stress per unit cross-sectional area at 40° C. is 1.00 to 1.30.

2. The biaxially stretched microporous film according to claim 1, wherein the film comprises band-shaped polyethylene material relaxation-treated in a film longitudinal direction.

3. The biaxially stretched microporous film according to claim 1, wherein the film comprises band-shaped polyethylene material stretch-treated while being heated while being moved along a temperature gradient.

4. The biaxially stretched microporous film according to claim 1, wherein a film width direction component of shrinkage stress per unit cross-sectional area at 40° C. is not greater than 1.2 N/mm².

5. The biaxially stretched microporous film according to claim 1, wherein variation of the film width direction component or a film longitudinal direction component of shrinkage stress per unit cross-sectional area at 40° C. is less than 0.1 N/mm².

6. A biaxially stretched microporous film comprising band-shaped polyethylene material having a film width of not less than 300 mm, wherein distribution of physical properties in a film width direction and a thickness variation is less than 1.00 μm, air permeability variation is not greater than 50 seconds/100 mL, and a film width direction component of shrinkage stress per unit cross-sectional area at 40° C. is not greater than 1.2 N/mm².

7. The biaxially stretched microporous film according to claim 6, wherein the film comprises band-shaped polyethylene material relaxation-treated in a film longitudinal direction.

8. The biaxially stretched microporous film according to claim 6, wherein the film comprises band-shaped polyethylene material stretch-treated while being heated while being moved along a temperature gradient.

9. The biaxially stretched microporous film according to claim 6, wherein variation of the film width direction component or a film longitudinal direction component of shrinkage stress per unit cross-sectional area at 40° C. is less than 0.1 N/mm².

10. A biaxially stretched microporous film comprising band-shaped polyethylene material having a film width of not less than 300 mm, wherein distribution of physical properties in a film width direction and a thickness variation is less than 1.00 μm, air permeability variation is not greater than 50 seconds/100 mL, and variation of the film width direction component or a film longitudinal direction component of shrinkage stress per unit cross-sectional area at 40° C. is less than 0.1 N/mm².

11. The biaxially stretched microporous film according to claim 10, wherein the film comprises band-shaped polyethylene material relaxation-treated in a film longitudinal direction.

12. The biaxially stretched microporous film according to claim 10, wherein the film comprises band-shaped polyethylene material stretch-treated while being heated while being moved along a temperature gradient.

13. The biaxially stretched microporous film according to claim 10, wherein, in regard to distribution of physical properties in the film width direction, a ratio of a maximum value and a minimum value (maximum value/minimum value) of shrinkage stress per unit cross-sectional area at 40° C. is 1.00 to 1.30.

14. The biaxially stretched microporous film according to claim 10, wherein a film width direction component of shrinkage stress per unit cross-sectional area at 40° C. is not greater than 1.2 N/mm².

* * * * *